UNITED STATES PATENT OFFICE.

MARY SUTHERLAND, OF DIAMOND, MISSOURI.

COMPOSITION FOR TANNING.

SPECIFICATION forming part of Letters Patent No. 350,706, dated October 12, 1886.

Application filed December 19, 1885. Serial No. 186,195. (Specimens.)

*To all whom it may concern:*

Be it known that I, MARY SUTHERLAND, of Diamond, in the county of Newton and State of Missouri, have invented a new and useful Composition of Matter to be used for the Purpose of Tanning Hides, of which the following is a full, clear, and exact description.

My composition consists of the following ingredients combined substantially in the proportions stated: Extract of cockle-burr, (*Xanthium strumarium,*) formed by boiling the leaves, stems, or burrs of the weed, five pounds; water to replace the water of evaporation; terra-japonica, three pounds; extract of hemlock, two pounds; commercial sulphuric acid, three ounces.

In mixing the above-named composition I take five pounds of the leaves, stems, and burrs of the weed known as the "cockle-burr," and boil it in six gallons of water for one hour. I then remove the weed and add as much water as has been evaporated, after which I add three pounds of terra-japonica and two pounds of extract of hemlock. After this is melted and cooled to blood-heat I put in three ounces of commercial sulphuric acid and stir the whole mixture.

Hides which have been treated in the usual manner are put into the tanning mixture prepared as above described, where they are handled for a short time, and are then straightened out and left to soak in the mixture for a length of time depending upon the grade and quality of the skin or hide. Light hides—such as sheep, dog, or deer skin—will tan in about ten hours; calf-skin in from two to four days; heavier hides, from which harnesses and sole-leather are made, require from six to eight days, and in some cases, for very heavy leather, a little longer time. After the hides have been tanned, as described, they are submitted to any of the well-known finishing processes, and the leather thus made will be found to be soft and strong, and will remain in a soft and pliable condition. It will be found that the leather will not be materially injured by dampness or moisture, and that it will wear for a long time, and will stand a continued and prolonged usage. The best effects are obtained if the mixture is kept warm during the process of tanning the hides.

Having thus described my invention, what I claim as new, and desire to secure by Letters Patent, is—

The herein-described composition of matter to be used in tanning hides, which consists of water, extract of cockle-burr, terra-japonica, extract of hemlock, and commercial sulphuric acid, substantially in the proportions specified.

MARY SUTHERLAND.

Witnesses:
C. S. HART,
GEO. HOFFMAN.